(12) United States Patent
Piper, Jr. et al.

(10) Patent No.: US 6,305,301 B1
(45) Date of Patent: Oct. 23, 2001

(54) SUPPORT STRUCTURES SUCH AS PALLETS AND METHODS AND SYSTEMS RELATING THERETO

(75) Inventors: Paul P. Piper, Jr., Orlando, FL (US); Leslie E. Smith, Lapeer, MI (US)

(73) Assignee: Piper Plastics, Inc., Orlando, FL (US)

( * ) Notice: Subject to any disclaimer, the term of this patent is extended or adjusted under 35 U.S.C. 154(b) by 0 days.

(21) Appl. No.: 09/361,354

(22) Filed: Jul. 26, 1999

(51) Int. Cl.$^7$ ................................................. B65D 19/38
(52) U.S. Cl. ...................................................... 108/57.25
(58) Field of Search ........................... 108/57.25, 57.27, 108/57.28, 57.26, 901, 902, 57.29, 57.34

(56) References Cited

U.S. PATENT DOCUMENTS

| | | |
|---|---|---|
| D. 256,904 | 9/1980 | Persson . |
| D. 267,126 | 11/1982 | Jonebrant . |
| D. 374,536 | 10/1996 | Elder et al. . |
| 3,490,583 | 1/1970 | Cook . |
| 3,699,901 * | 10/1972 | Cook, III ........................... 108/57.25 |
| 3,719,157 * | 3/1973 | Arcocha et al. ................... 108/57.25 |
| 3,720,176 | 3/1973 | Munroe . |
| 3,768,423 | 10/1973 | Cook, III et al. . |
| 3,795,206 | 3/1974 | Utz . |
| 3,878,796 | 4/1975 | Morrison . |
| 3,951,078 | 4/1976 | Fowler et al. . |
| 4,029,023 | 6/1977 | Rosewicz et al. . |
| 4,051,787 | 10/1977 | Nishitani et al. . |
| 4,103,857 | 8/1978 | Levenhagen . |
| 4,397,246 | 8/1983 | Ishida et al. . |
| 4,413,737 * | 11/1983 | Wind ............................... 108/53.3 X |
| 4,606,278 * | 8/1986 | Shuert ............................... 108/57.27 |
| 4,674,414 * | 6/1987 | Nule et al. ........................... 108/55.3 |
| 4,809,618 | 3/1989 | Bell . |
| 5,117,762 | 6/1992 | Shuert . |
| 5,123,359 * | 6/1992 | DelBalso ............................ 108/57.27 |
| 5,415,109 | 5/1995 | McBride . |
| 5,435,954 | 7/1995 | Wold . |
| 5,505,141 * | 4/1996 | Barber ............................... 108/57.26 |
| 5,566,624 | 10/1996 | Brown et al. . |
| 5,676,064 * | 10/1997 | Shuert ............................... 108/57.25 |
| 5,685,233 | 11/1997 | DeJean . |
| 5,687,652 * | 11/1997 | Ruma ................................ 108/57.25 |
| 5,778,801 * | 7/1998 | Delacour ........................... 108/57.25 |
| 5,845,588 * | 12/1998 | Gronnevik ......................... 108/57.27 |
| 5,894,803 * | 4/1999 | Kuga ............................. 108/57.25 X |
| 5,921,189 * | 7/1999 | Estepp .......................... 108/57.25 X |
| 6,006,677 * | 12/1999 | Apps et al. ........................ 108/57.25 |

OTHER PUBLICATIONS

Kraton Polymers Processing Guide (as it appeared on–line as of May 3, 1999).
Kraton Polymers and Compounds Typical Properties Guide (as it appeared on–line as of May 3, 1999).
Shell Kraton Polymers for Modification of Thermoplastics (as it appeared on–line as of May 3, 1999).

* cited by examiner

Primary Examiner—Jose V. Chen
(74) Attorney, Agent, or Firm—Dean W. Russell; Kilpatrick Stockton LLP

(57) ABSTRACT

Support structures, systems, and methods are disclosed. Among the support structures are pallets designed especially, although not necessarily exclusively, for cold-weather environments such as commercial refrigerators and freezers and refrigerated transport carriers. Such pallets may include non-skid materials and optionally are recyclable, have improved stacking and load-bearing attributes, and incorporate recycled materials.

20 Claims, 6 Drawing Sheets

SUPPORT STRUCTURES SUCH AS PALLETS AND METHODS AND SYSTEMS RELATING THERETO

FIELD OF THE INVENTION

This invention relates to methods and systems for forming and utilizing support structures (including but not necessarily limited to pallets) and more particularly to such structures which optionally may be recycled, have improved characteristics for stacking, and have any or all of non-skid, glass, and recycled materials incorporated thereon or therein.

BACKGROUND OF THE INVENTION

Numerous designs of pallet-like support structures exist today. U.S. Pat. No. 3,490,583 to Cook, for example, illustrates in its FIG. 1 a shipping pallet (designated by the numeral "4"). Such pallet consists merely of a horizontal platform from which vertical legs depend at two opposed sides. Space underneath the horizontal platform allows entry of times of a fork-lift truck (or pallet jack) from the sides from which legs do not depend, permitting movement of the pallet when loaded with products.

Placement and use in a refrigerator or freezer of a pallet like that shown in the Cook patent is problematic for many reasons, however. Among difficulties involved in using this type of pallet in a cold environment is the low coefficient of friction of the wood or other material of which the pallet typically is formed. The Cook patent arguably attempts to address this difficulty at least partially by coating the undersides of load-containing trays, made of paperboard or wood, with a solution of synthetic latex.

Such latex coating, as described in the Cook patent, is intended primarily to prevent slippage between the trays of the load. It accordingly is not applied to the pallet itself, retaining the vulnerability of the pallet to sliding relative to the fork-life times when moved. Synthetic latex additionally is neither thermoplastic nor adequately recyclable in many circumstances. Recyclability is not expressed as an objective of the subject matter of the Cook patent, moreover, as in practice the types of pallets illustrated therein often are disposed of by chipping, shredding, burning, or dumping in landfills.

U.S. Pat. No. 5,685,233 to DeJean purports to describe a recyclable pallet assembly. Included in the assembly are support bars and stringers, all of which, according to the Abstract of the DeJean patent, "may be provided with an anti-skid surface for protecting a user walking on the pallet." The DeJean patent thereafter refers to the anti-skid material as constituting "a coating consisting of sand grit, or other particulate, intermixed with an adhesive, such as an epoxy resin," however, precluding the assembly from being recyclable and reextrudable. Again, moreover, no anti-skid material of any type is applied to the undersides of the assembly, retaining the vulnerability to sliding discussed above.

Yet another pallet is disclosed in U.S. Pat. No. 4,397,246 to Ishida, et al., which patent is incorporated herein in its entirety by this reference. Detailed in the Ishida patent is a pallet whose deck board surface is grooved so as to receive separate "slip preventing members" in the form of soft, deformable cords. Alternatively, the cords may be welded directly to the surface of the deck board. In either event, according to the Ishida patent, "each slip preventing member must project beyond the upper or lower surface of the deck board."

To provide surfaces in which the grooves may be formed, the pallet of the Ishida patent comprises a hollow rectangular molded body. Accordingly, it has an integral support base or bottom, such as is shown beneath the rectangular openings of FIGS. 1 and 3 of the Ishida patent. By contrast with the soft, deformable material from which the cords are formed, this base has the same rigidity as the remainder of the pallet. Should it crack or break, the load-distribution characteristics of the pallet may change sufficiently to preclude its further beneficial use.

SUMMARY OF THE INVENTION

The present invention provides alternative pallets and other support structures and methods and systems for forming and utilizing them. Pallets of the invention are especially (although not exclusively) designed for improved performance in places, such as commercial refrigerators and freezers and refrigerated transport containers, subjected to decreased temperatures. They additionally optionally are recyclable, have improved stacking and load-bearing attributes, and incorporate recycled materials.

Certain embodiments of pallets consistent with the concepts of the invention may be made of thermoformable material such as high density polyethylene (HDPE). As well an olefinic rubber, or thermoplastic olefin such as a Kraton polymer available through Shell Chemical Company, 1415 West 22nd Street, Oak Brook, Ill. 60522-9008, may be incorporated into or onto portions of the pallets. Non-polar materials like these have many characteristics in common with, and thus bond well, to olefins including HDPE. By contrast, polarized materials such as urethanes can decrease the flexural modulus and tensile strength of predominately HDPE-containing support structures. Slickness of urethanes additionally increases at low temperatures, undermining their use as non-skid materials in refrigerators and freezers.

Although a Kraton polymer or other thermoplastic olefin may be brushed or sprayed onto or otherwise combined in any suitable manner with the remainder of the thermoformable material of the present invention, it preferably is co-extruded on portions of upper and lower surfaces of the structure. Similar shrink-rate characteristics of Kraton polymers and HDPE reduce tendency for warping and wrinkling during the co-extrusion process. Use of Kraton polymers additionally may diminish the instability inherent in exposure of pallets to ultraviolet radiation and increase material-compatibility for purposes of recycling the structures.

Embodiments of the platform portion of the present invention additionally may be formed from a single sheet of thermoformable material, with the sheet being contoured to create ridges (ribs) and, if desired, double- or parallel-walled edges. Inclusion of double-walled edges may avoid substantial degradation of performance should the outer wall break or crack, as can occur sometimes when the outer wall is impacted by, for example, a rapidly-moving fork-lift time. To maximize strength for particular pallet heights, preferred draw between the top of a ridge and top of a base portion of some pallets is approximately one and one-half inches. Those skilled in the art will, however, recognize that the invention is not limited to pallets having this particular draw amount and that other draw amounts may exist instead.

Further features of support structures of the present invention include use of separate foot beams and bottom deck boards or bases. These feet may be formed either individually or in groups and thereafter attached to the underside of the platform portion of a pallet. Creating feet in groups effectively fixes a minimum dimension of the platform, however, as it must be sufficiently long or wide to receive the group of feet. By contrast, utilizing individually-formed feet optimizes the ability to manufacture differently-dimensioned platforms, as the numbers of feet attached to particular platforms may be varied as necessary or appropriate.

In either circumstance, however, the feet (if present) may be attached to a platform by a low-density polyethylene (or other) material if desired. Typically the platform will be preheated in the area receiving the attachment material, which material will then be extruded or otherwise applied to the platform as molten plastic. Application of the attachment material may be automated as, for example, by having a heater, followed by at least one extruder, traverse the lengths of each foot. In one preferred method, two extruders are employed simultaneously, with each positionable along a longitudinal side of the tops of the feet. Regardless of application method, however, once cooled the attachment material effectively welds the foot to the platform, with the low density of the material providing it some flexibility to absorb shocks caused by times or other equipment impacting the foot.

Connected to the lower surfaces of the feet in some embodiments of the invention are one or more removable and recyclable bottom boards or bases. Rather than forming such bases integrally with the platforms (as contemplated, for example, in the Ishida patent), methods and systems of the present invention usually create them separately for any of multiple reasons. Creating such bases separately obviously permits their use to be optional, unlike the integral base of the pallet of the Ishida patent. They additionally may be made to be more flexible than the platforms of the pallets, allowing them both to conform somewhat to uneven surfaces and to bend or flex, rather than break, in response to certain impacts. Should a bottom board nevertheless break in use, it may merely be removed from the pallet and replaced, without having to replace the remainder of the pallet.

The bottom boards or bases additionally function to distribute loads more evenly. Their lower surfaces too may have non-skid material, as mentioned earlier, incorporated therein or thereon if desired. Alternatively, (removable) rubber grommets or other components or mechanisms may be used to increase the friction available to retain the lower surfaces of the bases in place. In some embodiments, the upper surfaces of the bases additionally are bevelled to guide times or jacks and facilitate their use.

Further features of structures of the present invention include their ability to nest in pairs, thus diminishing the volume required for their storage in advance of use, and provision of four-way entry for times or jacks. Because adapted to be formed from a single sheet of material, the platforms of the invention may include holes in their sections between ridges permitting fluid to drain through them. This drainage reduces the possibility of fluid stagnating on the platforms and having potentially undesirable effects. Glass and recycled material (as noted above), finally, may be incorporated into the structures of the present invention, with the former acting as rebarring material and reducing creep of any HDPE present therein. As thus constructed, single sheet pallets of the invention have sufficient strength to be used as rack storage platforms for foodstuffs and other objects.

It is therefore an object of the present invention to provide pallets and other support structures and methods and systems for forming and using such structures.

It is also an object of the present invention to provide pallets designed for improved performance in environments, including commercial refrigerators and freezers and refrigerated transport carriers, frequently subjected to low temperatures.

It is another object of the present invention to provide pallets with improved stacking and load-bearing attributes and optionally which may incorporate recycled materials and themselves be recyclable.

It is a further object of the present invention to provide structures made of thermoformable material into or onto which a non-skid material is incorporated, in some embodiments on both upper and lower surfaces and on associated bottom boards.

It is yet another object of the present invention to provide such a non-skid material whose chemical constituency is functionally compatible with that of the thermoformable material from which other portions of the structure may be made.

It too is an object of the present invention to provide a pallet having a platform which may be formed of a single sheet of the thermoformable material, with the sheet being contoured to create ridges.

It is an additional object of the present invention to provide a platform having double-walled edges to reduce adverse effects of impact-related breakage of the outer edge.

Objects of the present invention also include providing feet and bottom boards separate from the pallet platforms and attaching the feet to the platforms so as to enhance their collective ability to avoid impact-related breakage.

Further objects of the present invention comprise providing the bottom boards with some flexibility and bevelling the boards for facilitating guiding times or jacks.

Other features, objects, and advantages of the present invention will be apparent with reference to the remainder of the text and drawings of this application.

DETAILED DESCRIPTION

Figure 1:
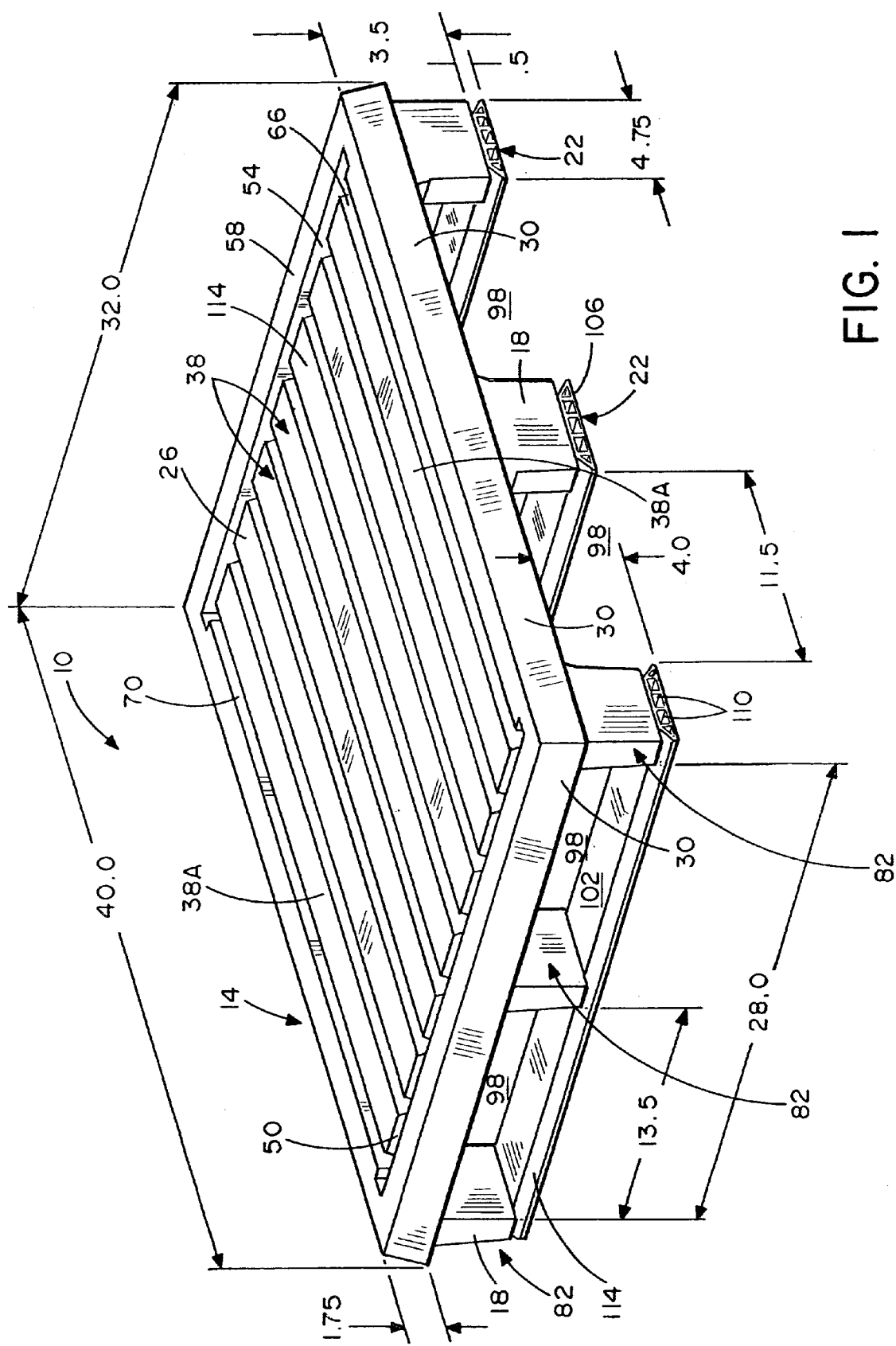
FIG. 1 is a perspective view of a pallet or other structural support of the present invention.

FIG. 1 illustrates a structural support in the form of pallet of the present invention. Included in pallet 10 of FIG. 1 are platform 14, feet 18, and (optional) bottom boards or bases 22. Any pair or all of these components may be integrally formed; preferably, however, they are created separately and connected in manners including those described herein. Pallet 10, consequently, may be particularly (although not exclusively) useful in situations where flexibility of its components may be needed to avoid impact-related damage.

Figure 4:
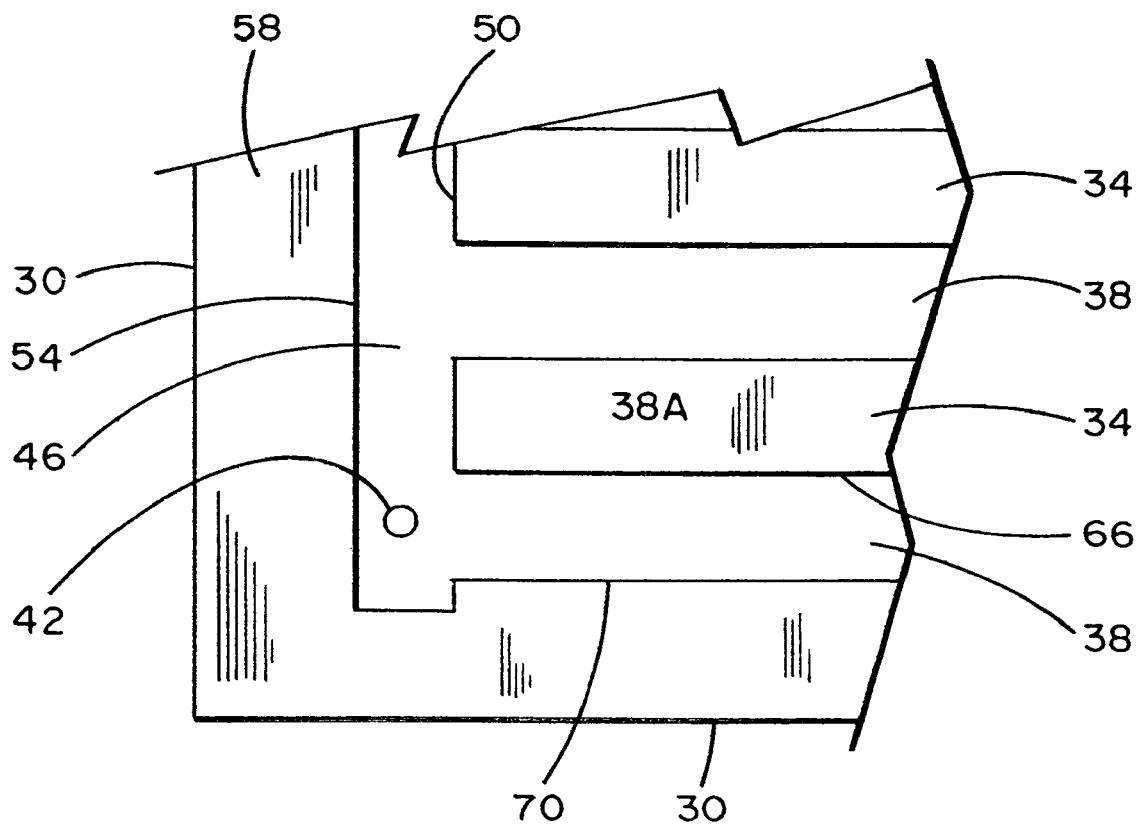
FIG. 4 is a plan view of a corner portion of the pallet of FIG. 1.

Shown in FIG. 1 is upper surface 26 of platform 14, whose edges as formed into outer walls 30. Also detailed in FIGS. 1 and 4 is the ridged nature of upper surface 26, with channels 34 spacing adjacent ridges 38. If, as in some embodiments of platform 10, outer walls 30 are approximately one and three-quarters inches high, the height of ridges 38 is approximately one and one-half inches. Such absolute and differential heights are not critical to the present invention, however, and may be changed as necessary or desired.

Platform 14 typically is made of a thermoplastic material comprising HDPE. It thus may be created from a solid sheet of material thermoformed into the ridged shape shown in FIG. 1. Ridges 38 function in many respects as reinforcing ribs, enhancing the load-bearing strength of platform 14. Forming platform 14 of a solid sheet of material additionally avoids creating a shell having a hollow internal structure into which liquid or solid matter can be admitted. This avoidance may in some cases be particularly important in commercial food-storage areas, where pallet breakage is significant (which may allow admittance of foreign matter into the interiors of hollow pallets) and hygiene may be important. Because platform 14 is typically formed of a solid sheet, furthermore, one or more holes 42 may be created quite easily in channels 34 to allow liquid to drain away from its upper surface 26, permitting the platform 14 to be steam-cleaned relatively easily.

As illustrated especially in FIGS. 1 and 4, ridges 38 need not extend to outer walls 30 of platform 14. Creating ridges 38 in this manner defines a (nominally) transverse channel 46 partially bounded on one side by edges 50 of ridges 38. Bounding the opposite side of each transverse channel 46 is an inner wall 54, which together with a corresponding outer wall 30 forms a boundary ridge 58. Inner and outer walls 54 and 30 additionally serve as the double-walled edges of platform 14; should an outer wall 30 break or crack (as, for example, when impacted by a fork-lift time), the presence of a corresponding inner wall 54 minimizes degradation in performance of the pallet 10.

Similar (nominally) longitudinal boundary channels 62 may be present in platform 10. Such boundary channels 62 are bounded by a side 66 of each outermost ridge 38A and by inner wall 70, with each inner wall 70 and corresponding outer wall 30 again functioning as the double-walled edges of platform 14 described in the preceding paragraph. Each of the four sides of platform 14 consequently includes protection against performance degradation should integrity of an outer wall 30 be impaired.

Figure 5:
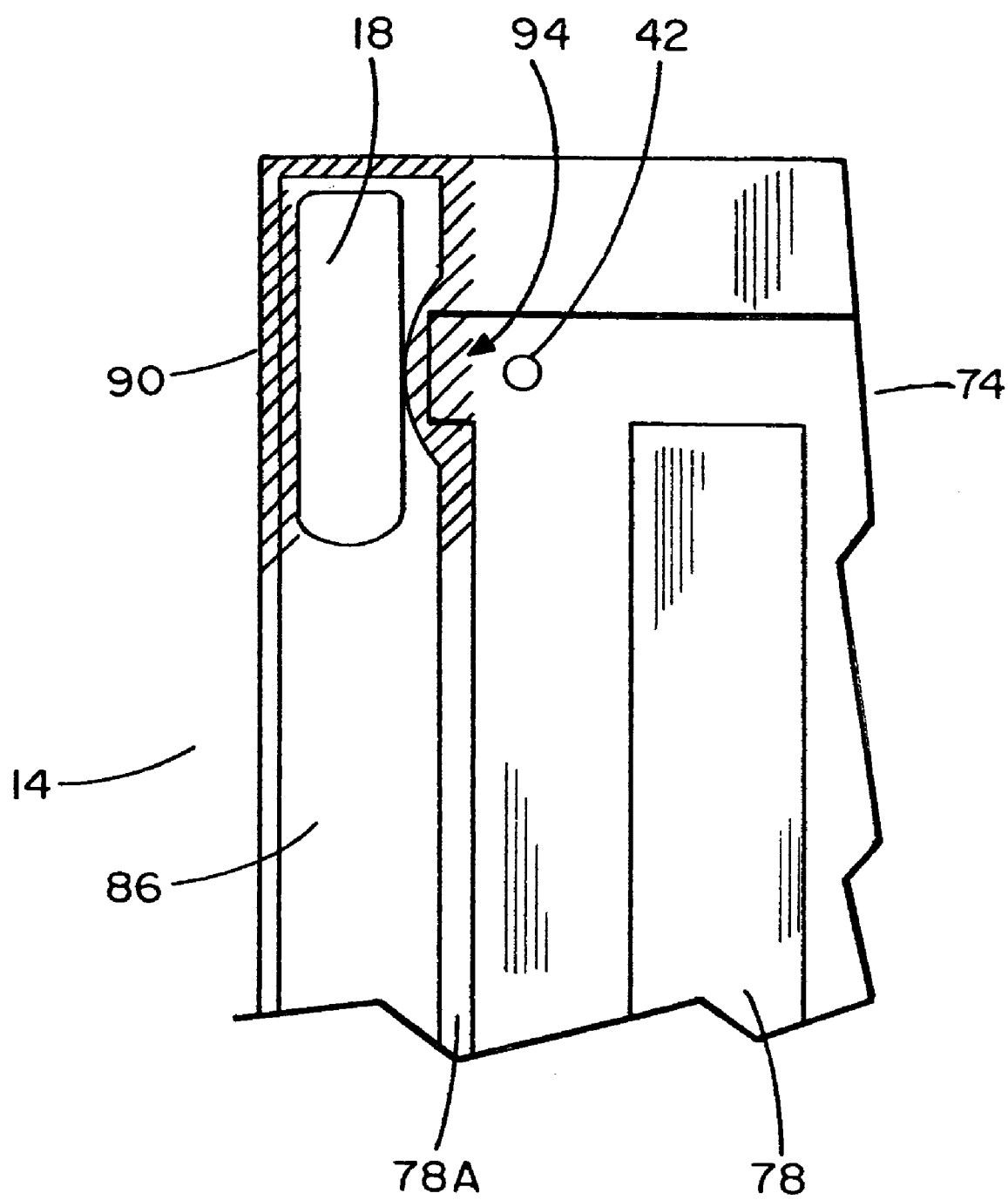
FIG. 5 is a plan view of a portion of the underside of the pallet of FIG. 1.

FIG. 5 details a portion of underside 74 of platform 14 together with an exemplary foot 18. Each of ridges 38 forms a corresponding channel, or slot 78, in underside 74 in which one or more feet 18 may be placed. Such feet 18 thus typically are oriented parallel to ridges 38 as shown in each of FIGS. 1–3 and 5. If placed in a slot 78A defined in underside 74 by inner wall 70 and outer wall 30, a foot 18 could provide further protection against degradation in performance should the outer wall 30 be broken or cracked.

Illustrated in FIG. 5 is foot beam or structure 82, which includes one or more feet 18 integrally formed with (or bonded to), depending from, and spaced along beam or rail 86. Rail 86 may be fitted into a slot 78 and fixed therein with adhesive, using mechanical fasteners (if removable for recycling), or by ultrasonic welding or any other suitable material or mechanism. A preferred attachment material 90 is low density polyethylene (LDPE), which following application and cooling can bond structure 82 to underside 74. Using LDPE maintains recyclability of pallet 10 while providing some flexibility to the connection between structure 82 and platform 14. This flexibility may be important should a foot 18 be impacted by an object in use, as it allows some bending of structure 82 relative to platform 14 before breakage of the connection occurs.

Rail 86 need not necessarily be present as part of pallet 10. If present, moreover, it need not necessarily extend substantially the entire length of the slot 78 into which it is fitted. Using an elongated rail 86 may be disadvantageous in some cases, as it effectively requires the length of the corresponding platform 14 to be at least its length, which may not always be preferred.

FIG. 5 further illustrates a protrusion 94 in underside 74 caused by extension of transverse channel 46 beyond inner walls 70. Such protrusion can provide an interference fit with rail 86 (which is deformable by contact with protrusion 94), thus facilitating its retention in slot 78A. Some or all of protrusions 94 need not necessarily be present in platform 14, however, as should be understood by those skilled in the art.

Three structures 82 (each containing three feet 18) are shown in FIG. 1. Spacing feet 18 in this manner defines a pair of openings 98 underneath each outer wall 30 of platform 14. Openings 98 are adapted to receive, for example, times of a fork-lift truck or walker-rider equipment, making pallet 10 accessible from any of its four sides. Unlike many plastic pallets, pallet 10 is capable of providing this "four-way" entry while retaining sufficient load-bearing capacity, even when edge racked, to be useful in many circumstances.

Bases 22, when present, may provide significant features to pallet 10. Typically extruded from polymeric material (such as but not limited to polyethylene) in the form shown in FIG. 1, each base 22 may comprise upper and lower surfaces 102 and 106, respectively, whose central portions are separated by internal ribs 110. Edges 114 of upper surface 102 may, however, be bevelled, functioning to guide times or similar equipment into openings 98 without damages the corresponding base 22.

In some embodiments of pallet 10, bases 22 are connected to feet 18 with screws or other mechanical fasteners, which must be removed before a pallet 10 is recycled. Other connection means or materials may, of course, be used instead. Bases 22 additionally may have grommets or other devices protruding from lower surfaces 106 to increase their frictional contact with, for example, a floor or storage rack.

By not integrally forming bases 22 with either or both of feet 18 and platform 14, such bases 22 indeed may be employed only when desired. Should a base 22 become damaged in use, moreover, it need merely be detached from feet 18 and replaced, thus avoiding one having to replace the entire pallet 10. Base 22 additionally made be made of less-rigid material than platform 14, allowing it to conform somewhat to an uneven surface and to bend or flex, rather than break, in response to certain impacts.

Figure 2:
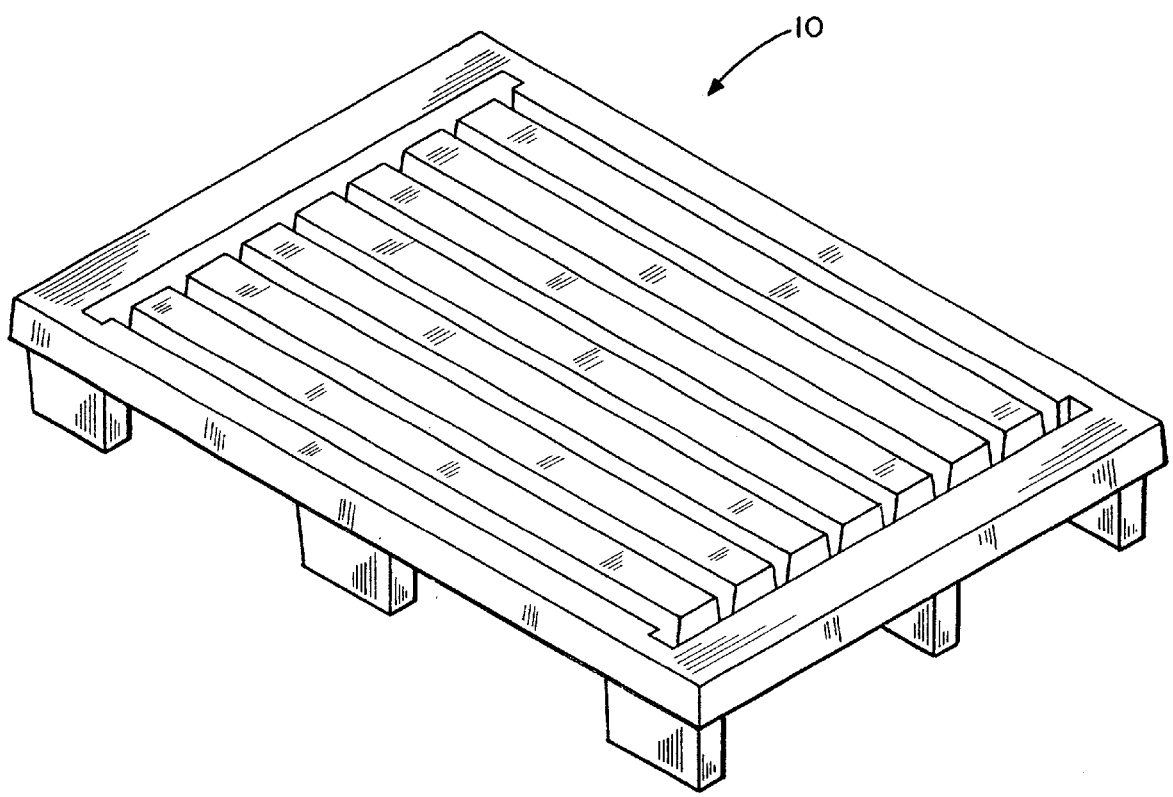
FIG. 2 is a perspective view of a pallet similar to FIG. 1 and omitting any bottom boards or bases.
Figure 3:
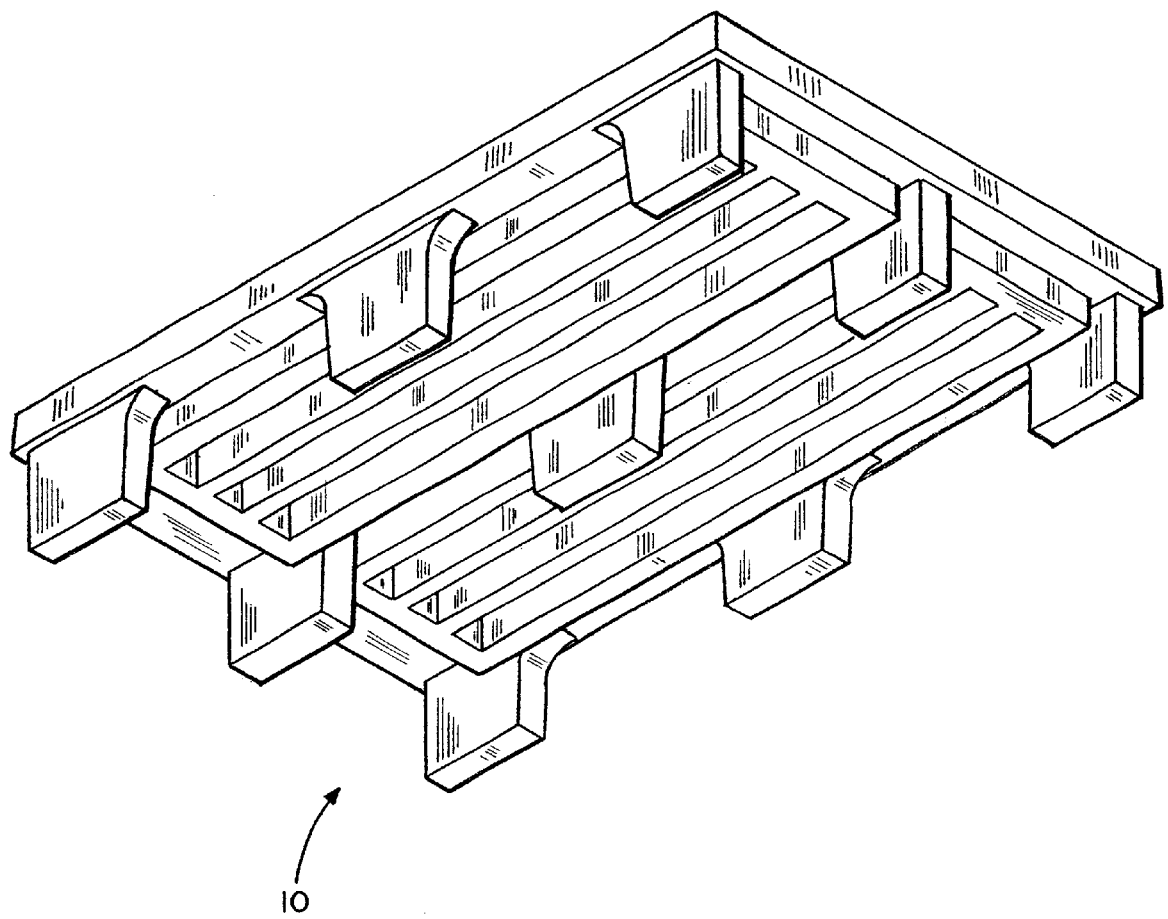
FIG. 3 is a perspective view of the underside of the pallet of FIG. 2.

FIGS. 2–3 illustrate the optional nature of bases 22, showing a pallet 10 which has omitted them either permanently or temporarily.

Pallets 10 of either FIG. 1 or FIG. 2 may be nested in pairs for storage or transport. To create one such pair, a first pallet 10 is turned upside down, so that its feet 18 extend upward. A second pallet 10 may then be placed thereover so that two feet 18 of the first pallet 10 protrude upward into openings 98 defined by the second pallet 10, while two feet 18 of the second pallet 10 protrude downward into openings 98 defined by the first pallet 10. The result is a pair of pallets 10 whose height is not substantially greater than the height of one such pallet 10, thus reducing the volume of space required to store or transport the pair. The length of the pair, while somewhat longer than the length of a single pallet 10 (because at least one foot 18 of each pallet 10 is not received by an opening 98 in the other pallet 10), is less than twice the length of a single pallet 10.

Excepting, perhaps, any mechanical fasteners employed as components of pallet 10, the pallet 10 is designed to be recyclable. Among materials useful for this purpose is polyethylene of which, if desired, the majority of pallet 10 may be made. Polyethylene tends to "creep," or "droop," under certain loading conditions, however, as its flexural modulus is relatively low. Pallet 10 hence may also include fiberglass or other substances for reinforcement. Usually, however, such pallet 10 will not include either wood (which as noted above is not readily recyclable) or thermosetting materials (as opposed to thermoformable thermoplastic materials such as HDPE). On the other hand, any or all of the thermoformable materials present in pallet 10 may, for example, be pre- or post-consumer or industrial waste, so that the pallet 10 includes recycled materials.

Each of upper surface 26, underside 74, and lower surface 106 (if present) of pallet 10 contacts another object in use. Upper surface 26 receives the load to be supported by pallet 10, while lower surface 106 typically rests in contact with a floor or components of a rack. Times or a pallet jack contact underside 74 when pallet 10 is moved from one location to another. Maintaining frictional contact adequate to prevent (or at least limit) relative movement between pallet 10 and each of the load, times, and rack or floor (or another empty pallet) may thus be important to avoiding damage to the load.

Accordingly, non-skid material 114 may be included as part of pallet 10. In certain preferred embodiments of the invention, such non-skid material 114 is co-extruded with a sheet of HDPE-containing material and then thermoformed together. Since both upper surface 26 and underside 74 may include non-skid material 114, such non-skid material may be extruded onto both sides of the HDPE-containing sheet ultimately forming platform 14. After having been heated and pressurized during the thermoforming process, the non-skid material 114 is integrated with the HDPE-containing sheet, whose rigidity is retained. There thus is no soft, deformable non-skid cord welded to or fitted into grooves of pallet 10, unlike the pallet of the Ishida patent. Likewise, non-skid material 114 may be co-extruded onto lower surface 106 of base 22.

Non-skid material 114 alternatively may be sprayed or otherwise applied to or incorporated into pallet 10. Regardless of application method, it need not necessarily be applied to the entirety of any of upper surface 26, underside 74, and lower surface 106. Instead, in many cases application of non-skid material 114 to only portions of these surfaces will produce satisfactory results.

Preferred constituents of non-skid material 114 are thermoplastic olefins such as Kraton polymer. Although many other compositions may be used as non-skid material 114, urethanes are not preferred for most embodiments of the invention because of their diminished performance at low temperatures. Incorporated herein in their entireties are the following brochures of Shell Chemical Company, as they appeared on-line as of May 3, 1999, describing Kraton polymers: "Kraton Polymers Processing Guide," "Kraton Polymers and Compounds Typical Properties Guide," and "Shell Kraton Polymers for Modification of Thermoplastics." Copies of these brochures are included with the Information Disclosure Submitted herewith.

Figure 6:
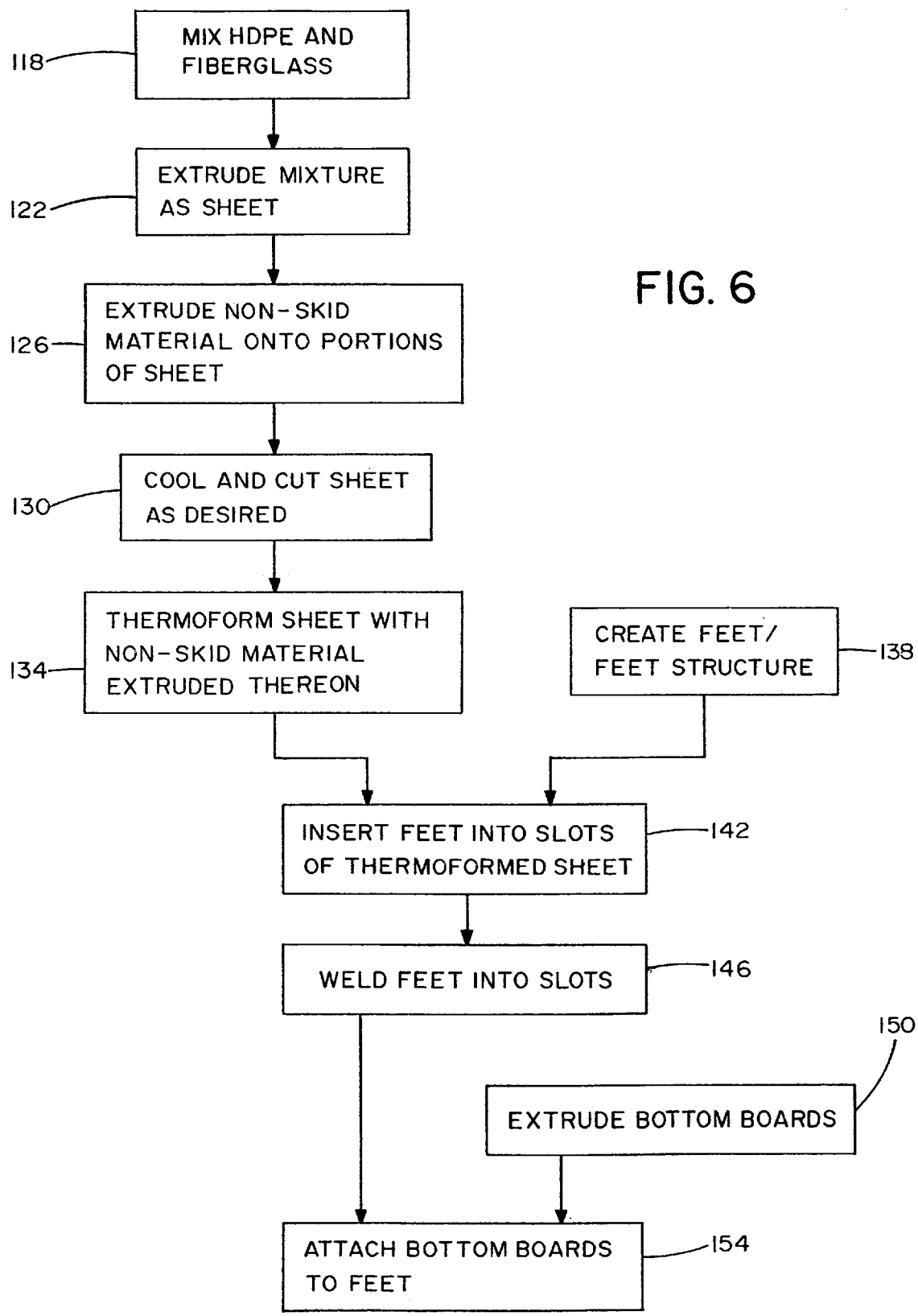
FIG. 6 is a diagrammatic representation of some elements o an exemplary method of manufacturing the pallet of FIG. 1.

FIG. 6 diagrams aspects of an exemplary method of creating a support structure of the present invention. As described in block 118, HDPE is mixed with fiberglass as the primary components of platform 14. The mixture is heated and extruded into a sheet as described in block 122, with non-skid material 114 being co-extruded onto at least portions of the sheet (see block 126). The sheet containing non-skid material 114 may then be cooled and cut to an appropriate shape (block 130), following which it is thermoformed into platform 14 (block 134).

As shown in block 138, formed separately (typically using an injection molding process) are (typically hollow) feet 18 (whether or not part of structure 82). One or more such feet 18 may then be inserted into appropriate slots 78 in the sheet forming platform 14 (block 142), after which LDPE polyethylene may be used to weld feet 18 in place (block 146). Separately extruded (or otherwise formed) bases 22 (see block 150), finally, may be attached to the feet as described in block 154.

The foregoing is provided for purposes of illustrating, explaining, and describing embodiments of the present invention. Modifications and adaptations to these embodiments will be apparent to those skilled in the art and may be made without departing from the scope or spirit of the invention. As but two of many examples of such modifications, platform 14 need not be rectangular if desired and the dimensions of pallet 10 may vary as appropriate for loads which it is to support.

What is claimed is:

1. A pallet comprising:
   a. a platform formed at least in part of thermoformable thermoplastic material including an olefinic non-skid material;
   b. at least one foot formed separately from the platform; and
   c. low density polyethylene material attaching the at least one foot to the platform.

2. A pallet according to claim 1 in which the thermoformable material comprises high density polyethylene.

3. A pallet according to claim 1 in which the platform is formed of a first extrusion comprising high density polyethylene and glass and a second extrusion comprising a olefinic non-skid material, the first and second extrusions forming a composite which is thermoformed.

4. A pallet according to claim 3 in which the thermoformed platform has an upper surface including a plurality of ridges spaced by one or more channels and a lower surface with at least some of the olefinic non-skid material thereon.

5. A pallet according to claim 1 in which the thermoformable material includes plastic post-consumer waste material mixed with glass.

6. A pallet according to claim 1 further comprising at least one base formed separately from the platform and foot but attached to the foot.

7. A pallet according to claim 6 in which the base has greater flexibility than the platform and an upper surface which is bevelled.

8. A support structure comprising:
   a. a load-bearing platform having an upper surface and a lower surface, at least one portion of each of such upper and lower surfaces comprising a non-skid material either co-extruded or brushed onto a thermoformable material containing polyethylene;
   b. a plurality of feet made from an injection moldable material and depending from the lower surface of the platform; and
   c. a plurality of bases, each of which bases (i) has a lower surface with non-skid material thereon and (ii) is not integrally formed with but attached to at least two feet, such attachment defining at least one opening bounded by the base, platform, and two feet and adapted to receive a fork-lift tine.

9. A support structure according to claim 8 in which the plurality of bases have greater flexibility than the platform and in which the plurality of feet are attached to but not integrally formed with the platform.

10. A support structure according to claim 8 in which the platform is thermoformed into a solid sheet of material containing, as part of its upper surface, a plurality of ridges, one end of each of at least some of such ridges partially bounding a first channel.

11. A support structure according to claim 10 in which the upper surface of the platform defines parallel inner and outer walls, the inner wall at least partially bounding the first channel and the outer and inner walls collectively forming a double-walled edge of the platform for improved impact resistance.

12. A support structure according to claim 10 in which the plurality of feet are attached to the lower surface of the platform at least in part by inserting them into slots defined by the existence of the ridges in the upper surface of the platform.

13. A support structure according to claim 12 in which, after they are inserted into slots, the plurality of feet and regions of the lower surface of the platform adjacent the feet are contacted by molten low density polyethylene so as to connect them.

14. A method of forming a pallet comprising:
   a. mixing a thermoformable material and glass;
   b. extruding the mixture as a sheet having an upper surface and a lower surface;
   c. co-extruding an olefinic non-skid material onto at least a portion of both the upper surface and the lower surface of the sheet so as to form a composite sheet; and
   d. thermoforming the composite sheet.

15. A method according to claim 14 further comprising creating a plurality of feet and attaching the feet to the thermoformed composite sheet.

16. A method according to claim 15 in which thermoforming the composite sheet causes the non-skid material to have approximately the same rigidity as the sheet so that it is not soft or deformable.

17. A method according to claim 16 in which the thermoformable material comprises recycled post-consumer material.

18. A method according to claim 17 further comprising forming a drain hole in the thermoformed composite sheet.

19. A support structure according to claim 8 in which at least one base also comprises an upper surface and a plurality of reinforcing ribs extending between the upper surface and the lower surface.

20. A nestable pair of pallets comprising:
   a. a first pallet comprising:
      i. a first platform having a bottom and formed at least in part of thermoformable thermoplastic material including an olefinic non-skid material; and
      ii. a plurality of first feet formed separately from but attached to the bottom of the first platform, such attachment defining at least one first opening between adjacent ones of the plurality of first feet;
   b. a second pallet comprising:
      i. a second platform having a bottom and formed at least in part of thermoformable thermoplastic material including an olefinic non-skid material; and
      ii. a plurality of second feet formed separately from but attached to the bottom of the second platform, such attachment defining at least one second opening between adjacent ones of the plurality of second feet; and
   in which, when nested, the first pallet is positioned relative to the second pallet so that at least one of the plurality of first feet extends into the at least one second opening and at least one of the plurality of second feet extends into the at least one first opening.

* * * * *